(12) United States Patent  (10) Patent No.: US 12,066,987 B2
Chao  (45) Date of Patent: Aug. 20, 2024

(54) SOFTWARE SERVICES WITH DECLARATIVE RESOURCE MODELING AND RESOURCE MODEL PATTERNS

(71) Applicant: Dell Products L.P., Round Rock, TX (US)

(72) Inventor: Ching-Yun Chao, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/048,669

(22) Filed: Oct. 21, 2022

(65) Prior Publication Data

US 2024/0134830 A1  Apr. 25, 2024
US 2024/0232143 A9  Jul. 11, 2024

(51) Int. Cl.
*G06F 16/21* (2019.01)
*G06F 16/2457* (2019.01)
*G06F 16/28* (2019.01)

(52) U.S. Cl.
CPC ........ *G06F 16/211* (2019.01); *G06F 16/2457* (2019.01); *G06F 16/288* (2019.01)

(58) Field of Classification Search
CPC ......... G06F 16/367; G06F 16/20; G06F 16/22
USPC ....................................................... 707/803
See application file for complete search history.

(56) References Cited

U.S. PATENT DOCUMENTS

2015/0379061 A1* 12/2015 Paraschivescu ...... G06F 16/219
707/695
2018/0349797 A1* 12/2018 Garvey .................... G06F 9/46

OTHER PUBLICATIONS

Chao, et al. "Scalable Access Control Mechanism" U.S. Appl. No. 17/932,905, filed Sep. 16, 2022, 51 pages.
Fang, et al. "Attribute-Based Access Control Using Scoped Roles and Conditioned PermissionsDynamic Policies" U.S. Appl. No. 18/331,770, filed Jun. 8, 2023, 47 pages.
Hu, et al. "Guide to Attribute Based Access Control (ABAC) Definition and Considerations" NIST Special Publication 800-162 [https://doi.org/10.6028/NIST.SP.800-162], Jan. 2014, 47 pages.
Ferraiolo, et al., "Extensible Access Control Markup Language (XACML) and Next Generation Access Control (NGAC)," ABAC '16: Proceedings of the 2016 ACM International Workshop on Attribute Based Access Control, Mar. 2016, 12 pages.
Ferraiolo, et al., "A Comparison of Attribute Based Access Control (ABAC) Standards for Data ServiceApplications" NIST SP 800-178, [http://dx.doi.org/10.6028/NIST.SP.800-178], Oct. 2016, 68 pages.

(Continued)

*Primary Examiner* — Hung T Vy
(74) *Attorney, Agent, or Firm* — Amin, Turocy & Watson, LLP

(57) ABSTRACT

A system can receive a first command that declares a first relationship between a first pair of computer resources of a group of computer resources, wherein the first relationship is any first one from a group of relationships, wherein a number of relationships in the group of relationships has a defined size. The system can receive a second command that declares a second relationship between a second pair of computer resources of the group of computer resources, wherein the second relationship is any second one from the group of relationships. The system can create a resource model for the group of computer resources based on the first command and the second command. The system can store the resource model in a memory.

20 Claims, 13 Drawing Sheets

(56) References Cited

OTHER PUBLICATIONS

"Dell EMC OpenManage EnterpriseSupportAssist Version 1.1" [https://dl.dell.com/topicspdf/openmanage-enterprise-supportassist_users-guide2_en-us.pdf], Jun. 2021, 65 pages.
"Scopes" [https://auth0.com/docs/get-started/apis/scopes] retreived Nov. 3, 2023, 4 pages.
"Cortex XDR Pro Administrator Guide" [https://docs.paloaltonetworks.com/content/dam/techdocs/en_US/pdf/cortex/cortex-xdr/cortex-xdr-pro-admin/cortex-xdr-pro-admin.pdf/cortex-xdr-pro-admin.pdf], retreived Nov. 3, 2023, 776 pages.
"Attribute Based Access Control" National Institute of Standards and Technology, [https://www.nccoe.nist.gov/sites/default/files/legacy-files/abac-fact-sheet.pdf], Sep. 2017, 2 pages.
"Hierarchical and recursive queries in SQL" Wikipedia. [https://en.wikipedia.org/wiki/Hierarchical_and_recursive_queries_in_SQL#Common_table_expression], retreived Nov. 30, 2023, 5 pages.
Kivimaki, Petteri. "AWS, Azure, GCP: Resource Hierarchies" [https://levelup.gitconnected.com/aws-azure-gcp-resource-hierarchies-25b829127511] Feb. 9, 2020, 15 pages.
"Hierarchical Data in SQL: The Ultimate Guide" [https://www.databasestar.com/hierarchical-data-sql/] Jun. 2, 2023, 21 pages.
"What are the options for storing hierarchical data in a relational database?" [https://stackoverflow.com/questions/4048151/what-are-the-options-for-storing-hierarchical-data-in-a-relational-database], retreived Nov. 3, 2023, 11 pages.
Monge, Alvaro. "Database design with UML and SQL, 4th edition" [https://web.csulb.edu/colleges/coe/cecs/dbdesign/dbdesign.php?page=intro.html], retreived Nov. 3, 2023, 2 pages.
"Jabbar et al. ""Dynamic Visibility and Authorization Policymanagement for a Cloud Service Platform"" U.S. Appl. No. 18/350,149, filed Jul. 11, 2023, 59 pages.".
"Acme Laboratories" [https://www.acme.com/], retrieved Dec. 1, 2023, 2 pages.
"Azure Policy definition structure" [https://learn.microsoft.com/en-us/azure/governance/policy/concepts/definition- structure], Aug. 15, 2023, 34 pages.
"Azure policyRule schema" [https://schema.management.azure.com/schemas/2020-10-01/policyDefinition.json], retrieved Dec. 1, 2023, 2 pages.
"Policy-based control for cloud native environments" Open Policy Agent. [https://www.openpolicyagent.org/], retrieved Dec. 1, 2023, 6 pages.
Goyal, et al. "Authorization Decisions Using Conditioned Permissions for Resource Collections" U.S. Appl. No. 18/364,939, filed Aug. 3, 2023, 53 pages.
Dasika, et al. "Data Center Monitoring and Management Operation Including a Data Tag Association Tracking Operation" U.S. Appl. No. 18/374,225, filed Sep. 28, 2023, 66 pages.
Guertin, et al. "Data Center Monitoring and Management Operation Including a Data Tag Management Operation" U.S. Appl. No. 18/241,030, filed Aug. 31, 2023, 73 pages.
Realegeno, et al. "User-Configurable Autotagging Policies" U.S. Appl. No. 18/241,040, filed Aug. 31, 2023, 71 pages.
Earley, et al. "Data Center Monitoring and Management Operation Including a Protected Data Tag Operation" U.S. Appl. No. 18/374,230, filed Sep. 28, 2023, 68 pages.
Sathaye, et al. "System and Methods for Dynamic Tags", U.S. Appl. No. 18/374,231, filed Sep. 28, 2023, 66 pages.

* cited by examiner

SOFTWARE SERVICES WITH DECLARATIVE RESOURCE MODELING AND RESOURCE MODEL PATTERNS

BACKGROUND

A resource model can comprise a schema that specifies how an application programming interface implements a set of interactions between user accounts and a computer service.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can receive a first command that declares a first relationship between a first pair of computer resources of a group of computer resources, wherein the first relationship is any first one from a group of relationships, wherein a number of relationships in the group of relationships has a defined size. The system can receive a second command that declares a second relationship between a second pair of computer resources of the group of computer resources, wherein the second relationship is any second one from the group of relationships. The system can create a resource model for the group of computer resources based on the first command and the second command. The system can store the resource model in a memory.

An example method can comprise receiving, by a system comprising a processor, a first command that declares a first relationship between a first pair of computer resources of a group of computer resources, wherein the first relationship is any first member of members of a group of relationships, wherein the group of relationships has a defined size. The method can further comprise receiving, by the system, a second command that declares a second relationship between a second pair of computer resources of the group of computer resources. The method can further comprise creating, by the system, a resource model for the group of computer resources based on the first command and the second command.

An example non-transitory computer-readable medium can comprise instructions that, in response to execution, cause a system comprising a processor to perform operations. These operations can comprise receiving a first command that declares a first relationship between a first subgroup of two computer resources of a group of computer resources, wherein the first relationship is a first member of members of a group of relationships, wherein respective relationships of the group of relationships are defined prior to receiving the first command, and wherein a number of relationships of the group of relationships is defined prior to receiving the first command. These operations can further comprise receiving a second command that declares a second relationship between a second subgroup of two computer resources of the group of computer resources, wherein the second relationship is a second member of the members of the group of relationships. These operations can further comprise creating a resource model for the group of computer resources based on the first command and the second command.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which.

DETAILED DESCRIPTION

Overview

Figure 1:
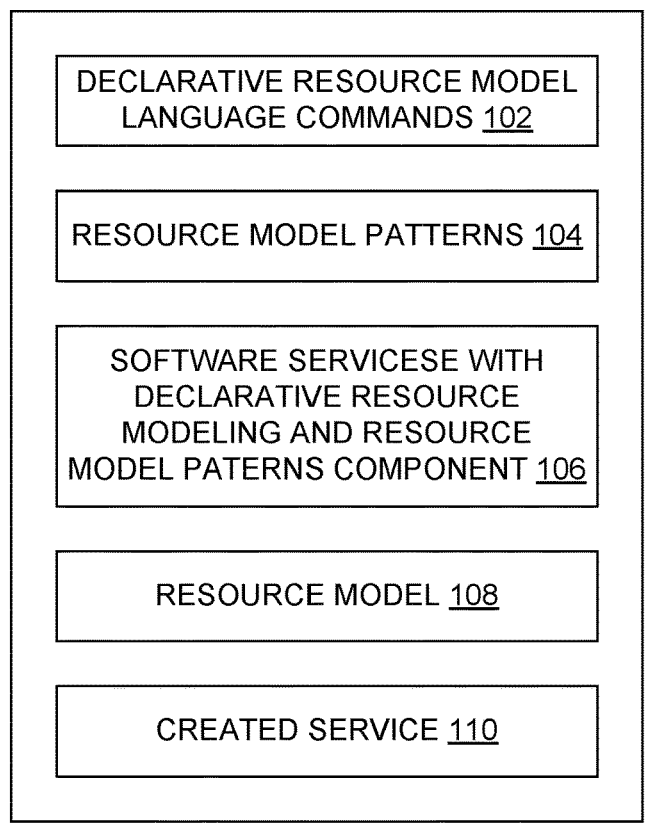
FIG. 1 illustrates an example system architecture that can facilitate software services with declarative resource modeling and resource model patterns, in accordance with an embodiment of this disclosure.

It can be common that network protocol software comprises sharable code, and often open-source code. This can be because network protocol software provides a single, focused functionality with a well-defined, common data model. In contrast, enterprise software built on a complex enterprise resource model can be difficult to be developed as common code. The complexity of an enterprise resource model and an unbreakable dependency that an enterprise software has on a resource model can make the code specialized and more than difficult to be sharable.

An Attribute Based Access Control (ABAC) system can comprise an example of a complex enterprise software with dependency to a complex enterprise resource model. In some examples, an ABAC system can be decomposed into a pipeline of three well-understood access control sub systems. The first stage of this pipeline can comprise a resource model with optimal query and reference query performance. The second stage of this pipeline can comprise a scoped-based access control engine, and the third stage of this pipeline can comprise a role-based access control engine. A complexity of an ABAC system can require significant development effort and investment.

The present techniques can be implemented to facilitate building an ABAC system once and reusing it on different enterprise resource models to reduce development cost.

For enterprise software that has a dependency on the specific, complex enterprise resource model, this dependency can make the enterprise software bound to the resource model. Take a three stage ABAC system as an example. The second stage's scope-based access control engine can have a dependency on the query application programming interface (API) and reference query API provided by the first stage resource model.

To make the enterprise software sharable and/or reusable, this dependency on an enterprise resource model can be broken. The present techniques can be implemented to break the resource model dependency.

One technique can be to compose an enterprise resource model using a set of resource model design patterns. This can help convert a hard resource model design problem into an engineering process.

Another technique can be to create a Declarative Resource Modeling Language (DRML) to further simplify the resource modeling engineering process to be repeatable.

The present techniques can be implemented to break complex enterprise application dependencies on an underlying enterprise resource model by using a declarative resource modeling language, which can remove otherwise hardcoded logic.

Design pattern based resource modeling can be implemented as follows. While the example used herein generally involves one resource model, it can be appreciated that the present techniques can be applied to other resource models.

Resource model design can generally comprise a process of planning, designing, and forming a structure representing a collection of resources. Resource model design can comprise an engineering product that satisfies functional and performance expectations, and it can also comprise a form of art with elegance and aesthetic appeal. According to the present techniques, a design pattern approach can be taken to turn resource model design into a pure engineering process using proven patterns. Resource model designs can be grouped into pattern types, such as a hierarchical relationship, an ownership relationship, a containment relationship, an inheritance relationship, and a many-to-many relationships.

A hierarchical relationship pattern can comprise a parent and child relationship between records of a same type. Examples of a hierarchical relationship can exist between a distributor partner organization and a reseller partner organization, or a reseller partner organization and an end customer organization: a service category and a lower-level subcategory: and/or a service and a lower-level service. A hierarchical relationship can be modeled in different ways.

For example, an adjacency list can have a relatively hard implementation to select data: an easy implementation to insert data: an easy implementation to update data: an easy implementation to delete data: have referential integrity: model a hierarchical relationship via a parent identifier: and have a performance that is expensive to query.

A nested set can have a relatively easy implementation to select data: a hard implementation to insert data: a hard implementation to update data: a hard implementation to delete data: lack referential integrity: model a hierarchical relationship via a left value and a right value: and have a performance that is expensive for insert, move, and delete operations.

A flat table can have a relatively easy implementation to select data: a hard implementation to insert data: an easy implementation to update data: an easy implementation to delete data: be not applicable to referential integrity: model a hierarchical relationship via a modified agency list adding order and level: and have a performance that is expensive for move and delete operations.

A bridge can have a relatively easy implementation to select data: an easy implementation to insert data: a hard implementation to update data: a hard implementation to delete data: have referential integrity: model a hierarchical relationship via a separate JOIN table: and have a performance that is O(log n) for insert, update, and delete operations.

A lineage column can have a relatively easy implementation to select data: an easy implementation to insert data: an easy implementation to update data: a hard implementation to delete data: lack referential integrity: model a hierarchical relationship via a lineage column (e.g., a path that is not normalized): and have a performance that is O(log n) for insert, update, and delete operations.

Different approaches can be implemented in different scenarios. For example, a bridge table approach can have a good query performance, which can be important in some scenarios. A bridge table approach can have a reasonable create, update, and delete performance. It can be that a bridge table implementation does not require a Structured Query Language (SQL) database vendor specific implementation. For these considerations, in some examples, a bridge table approach can be implemented for an enterprise application that requires both good query and create resources.

For an enterprise application that requires a different implementation, this can be done via a configuration setting to select an implementation and a corresponding pattern. It can be that this does not impact a pattern-based approach. It can be that some SQL database support multiple database deployments with a single primary and multiple backup configuration. Other SQL databases can comprise a distributed database architecture that supports active-active configurations across multiple data centers. Lacking a dependency upon a vender-specific implementation can facilitate choosing databases that can satisfy scalability and high availability requirements.

In an example, Declarative Resource Modeling Language can be defined as follows:

Create Hierarchical, Containment, Ownership, and Many-to-Many Relationships Syntax: CREATE <RELATIONSHIP>{Name1} [WITH {attribute Type, . . . } ] [OF {Name2} ] where RELATIONSHIP may be HIERARCHY|OWNERSHIP CONTAINMENT|MANY-TO-MANY Notations:
< >: angle brackets indicate operand
{ }: braces specify a required parameter (can be comma separated parameters)
[ ]: brackets indicate optional contents like options, parameters, and arguments
'|': a vertical bar signifies that you choose only one value.
Ellipsis . . . : Ellipsis indicate repetition or multiple values or parameters Examples:
CREATE HIERARCHY 'Organization'
CREATE HIERARCHY 'Organization' WITH name Text, country Text
CREATE CONTAINMENT 'Subscription' WITH order_number Integer OF 'Service' CREATE OWNERSHIP 'Organization' WITH name Text, country Text OF 'Subscription' CREATE MANY-TO-MANY 'Category' OF 'Service'

Creating an inheritance relationship using a DRML can be performed as follows:
Syntax: CREATE GENERALIZATION {Name1} [WITH {attribute Type, . . . } ]
Example:
CREATE GENERALIZATION OrganizationBase WITH baseAttribute
Syntax: CREATE SPECIALIZATION {Name2} [WITH {attribute Type, . . . } ]
FROM {Name1} Example: CREATE SPECIALIZATION Organization WITH attribute Type FROM OrganizationBase
Example: ADD More Relationship
Syntax: ADD <RELATIONSHIP> {Name1} [OF {Name2} ]

A DRML processor can generate Entities, perform ERM transformation, create query statements, create reference query statements with JOIN operations, define query representational state transfer (REST) application programming interfaces (APIs), and define reference query REST APIs.

The present techniques can be implemented to simplify enterprise resource modeling using a Declarative Resource Modeling Language (DRML) to describe an enterprise resource model in terms of a set of relationship design patterns.

A DMRL can be used to create query statements, create reference query statements with JOIN operations, define query REST APIs, and define reference query REST APIs. The present techniques can be implemented to transform enterprise software dependency on a resource model into a declarative dependency configuration automation process.

Prior approaches to develop complex enterprise software on complex enterprise resource model are generally performed according to one of two ways. One way is to develop a complex resource model and define query/reference query APIs from scratch, and then develop enterprise software making use of the query/reference query APIs. As a result, enterprise software can be tightly coupled with the specific enterprise resource model, which can be difficult to reuse by other organizations. A second way is to use an open source, or commercial, enterprise software that is close enough to the organization's requirements, and then use tools to create a resource model from scratch, and map the actual enterprise resource model to the features that the tool supports.

Example Architectures

FIG. 1 illustrates an example system architecture 100 that can facilitate software services with declarative resource modeling and resource model patterns, in accordance with an embodiment of this disclosure.

System architecture 100 comprises declarative resource model language commands 102, resource model patterns 104, software services with declarative resource modeling and resource model patterns component 106, resource model 108, and created service 110.

Declarative resource model language commands 102 can comprise commands to create part(s) of a resource model, expressed in a declarative resource model language, where the commands can state what characteristics the resource model is to have, without specifying how those characteristics are to be implemented as part of a resource model.

Resource model patterns 104 can comprise a finite group of patterns that can be used in creating a resource model from declarative resource model language commands 102. In some examples, these patterns can be a hierarchical relationship pattern, an ownership relationship pattern, a containment relationship pattern, an inheritance relationship pattern, or a many-to-many relationship pattern. In some examples, it can be that many different types of resource models can be created from these five patterns.

Figure 10:
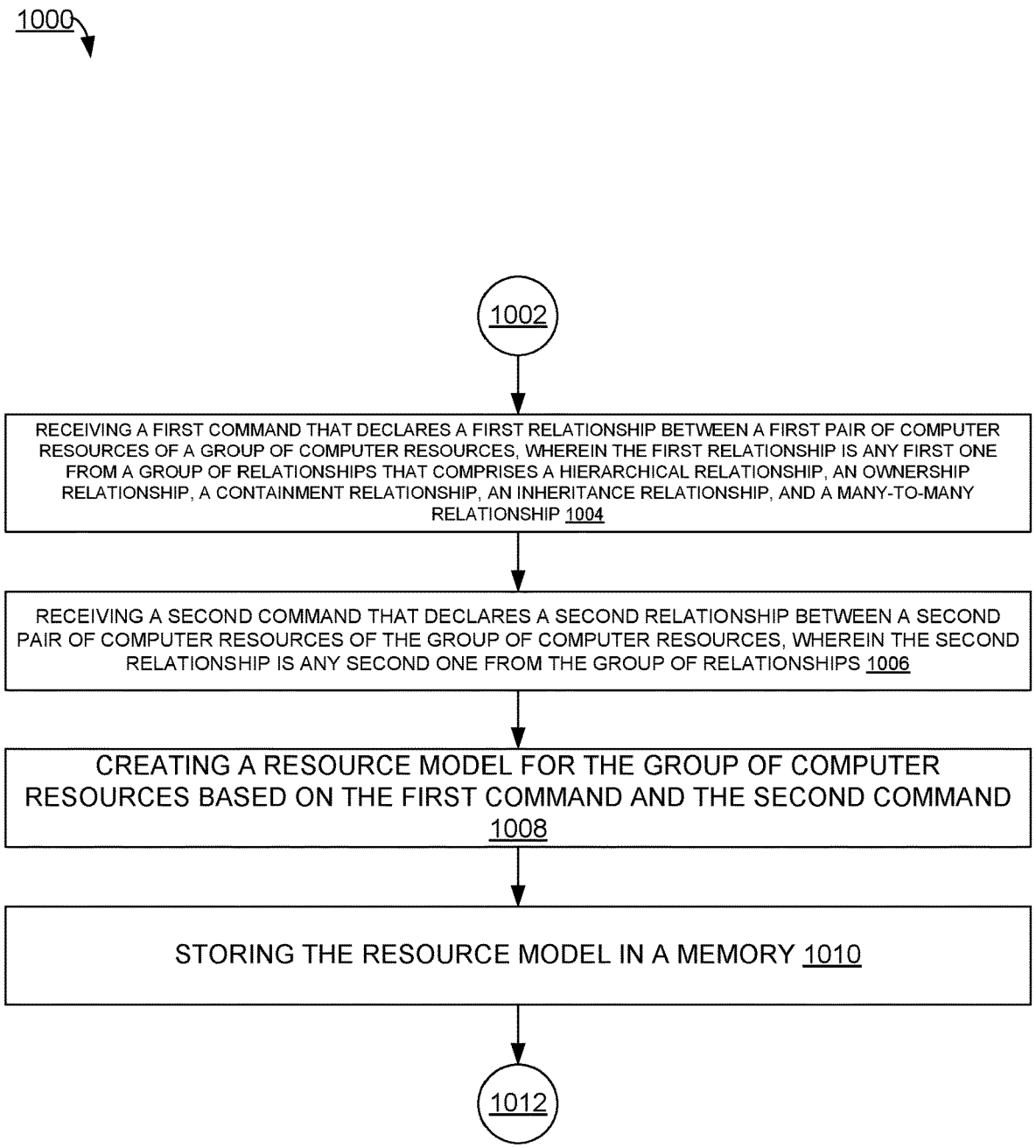
FIG. 10 illustrates an example process flow that can facilitate software services with declarative resource modeling and resource model patterns, in accordance with an embodiment of this disclosure.
Figure 11:
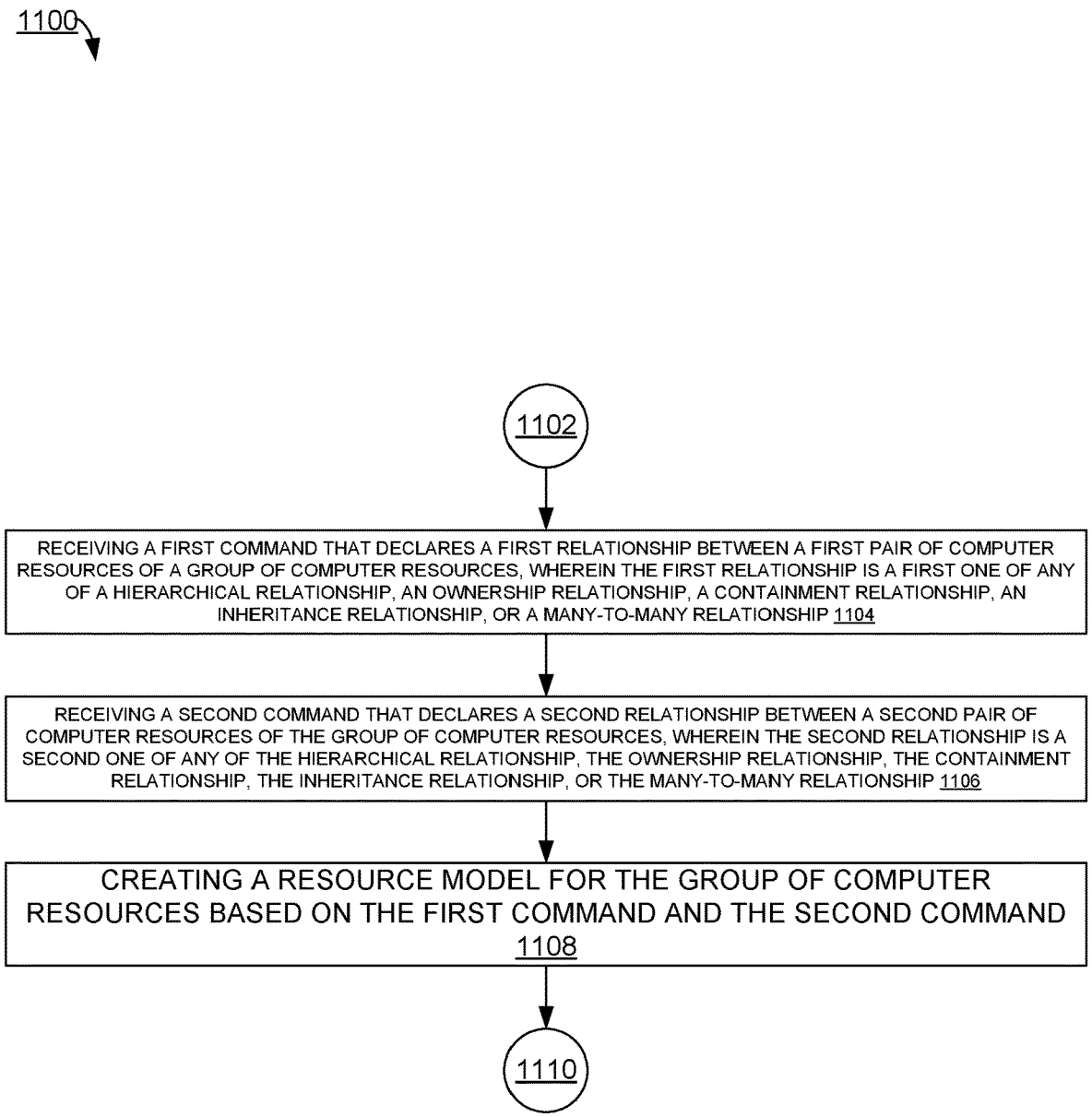
FIG. 11 illustrates another example process flow that can facilitate software services with declarative resource modeling and resource model patterns, in accordance with an embodiment of this disclosure.
Figure 12:
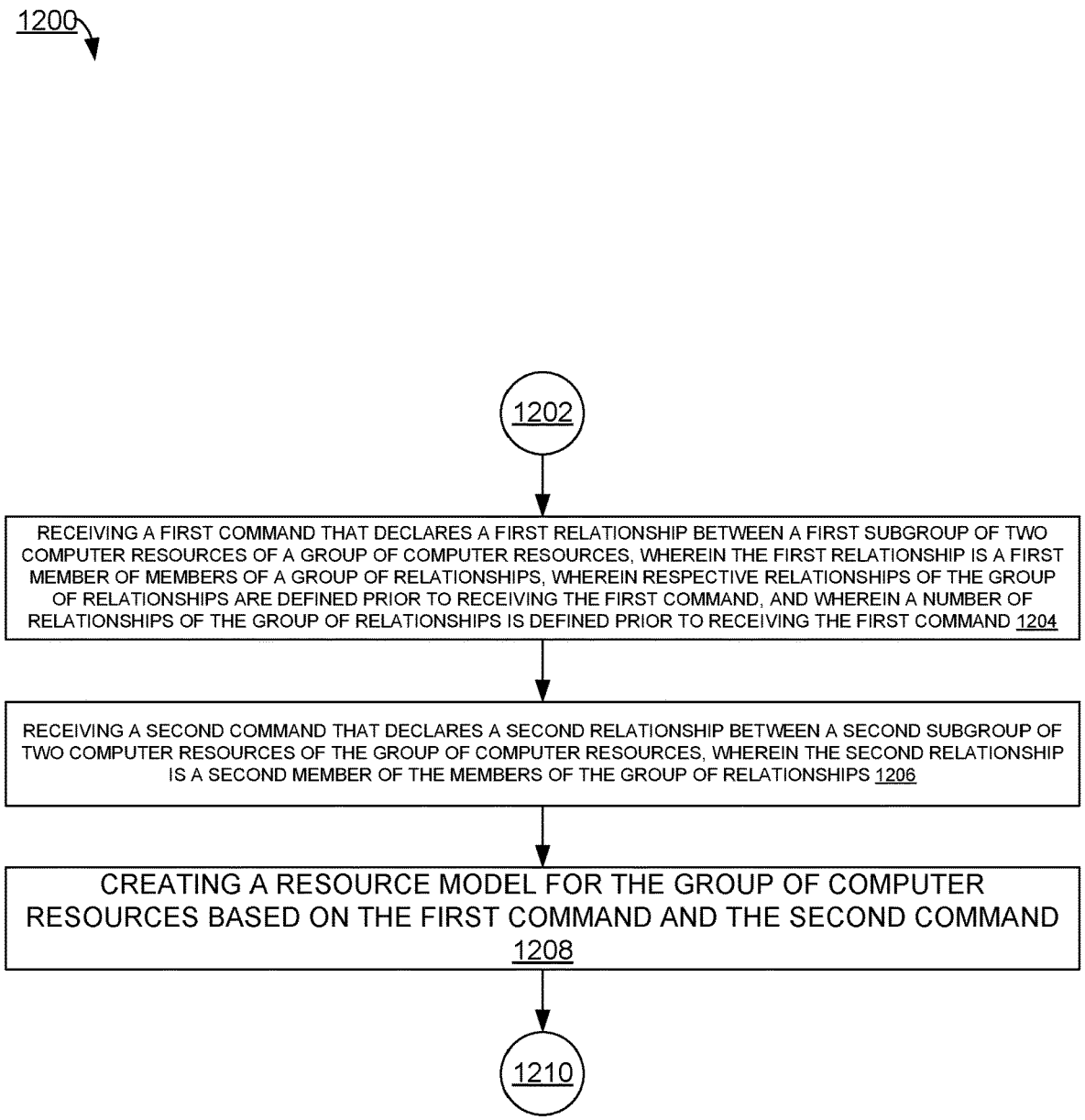
FIG. 12 illustrates another example process flow that can facilitate software services with declarative resource modeling and resource model patterns, in accordance with an embodiment of this disclosure.

In some examples, software services with declarative resource modeling and resource model patterns component 106 can implement part(s) of the process flows of FIGS. 10-12 to implement software services with declarative resource modeling and resource model patterns. Software services with declarative resource modeling and resource model patterns component 106 can take declarative resource model language commands 102 and resource model patterns 104, and from these, create resource model 108, as well as created service 110.

Resource model 108 can comprise a schema that specifies how an application programming interface implements a set of interactions between user accounts and a computer service. Created service 110 can comprise a computer service that implements an application programming interface that is specified by resource model 108.

It can be appreciated that system architecture 100 is one example system architecture for software services with declarative resource modeling and resource model patterns, and that there can be other system architectures that facilitate software services with declarative resource modeling and resource model patterns.

Figure 2:
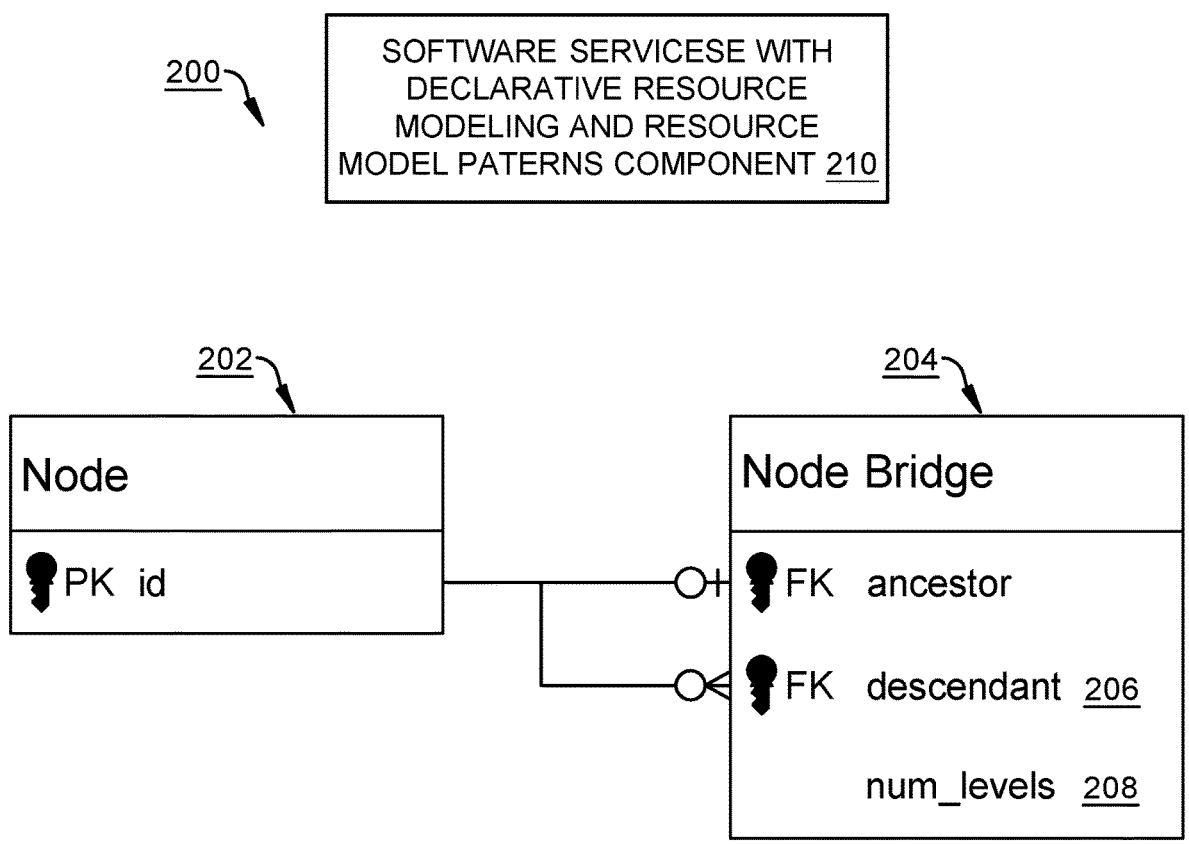
FIG. 2 illustrates an example system architecture of a bridge table that can facilitate software services with declarative resource modeling and resource model patterns, in accordance with an embodiment of this disclosure.

FIG. 2 illustrates an example system architecture 200 of a bridge table that can facilitate software services with declarative resource modeling and resource model patterns, in accordance with an embodiment of this disclosure. In some examples, part(s) of system architecture 200 can be implemented with part(s) of system architecture 100 of FIG. 1.

System architecture 200 comprises node 202, node bridge 204, and software services with declarative resource modeling and resource model patterns component 210) (which can be similar to software services with declarative resource modeling and resource model patterns component 106 of FIG. 1, and which can use a pattern of system architecture 200 to create a resource model from declarative commands). In turn, node bridge 204 comprises ancestor 206 and descendant 208. These parts of system architecture 200 can comprise primary keys (noted with "PK") and foreign keys (noted with "FK").

Ancestor 206 can indicate a parent node for node 202, and descendant 208 can indicate a child node for node 202. These identifiers of parent and child nodes can be used to implement a hierarchical relationship between nodes.

Figure 3:
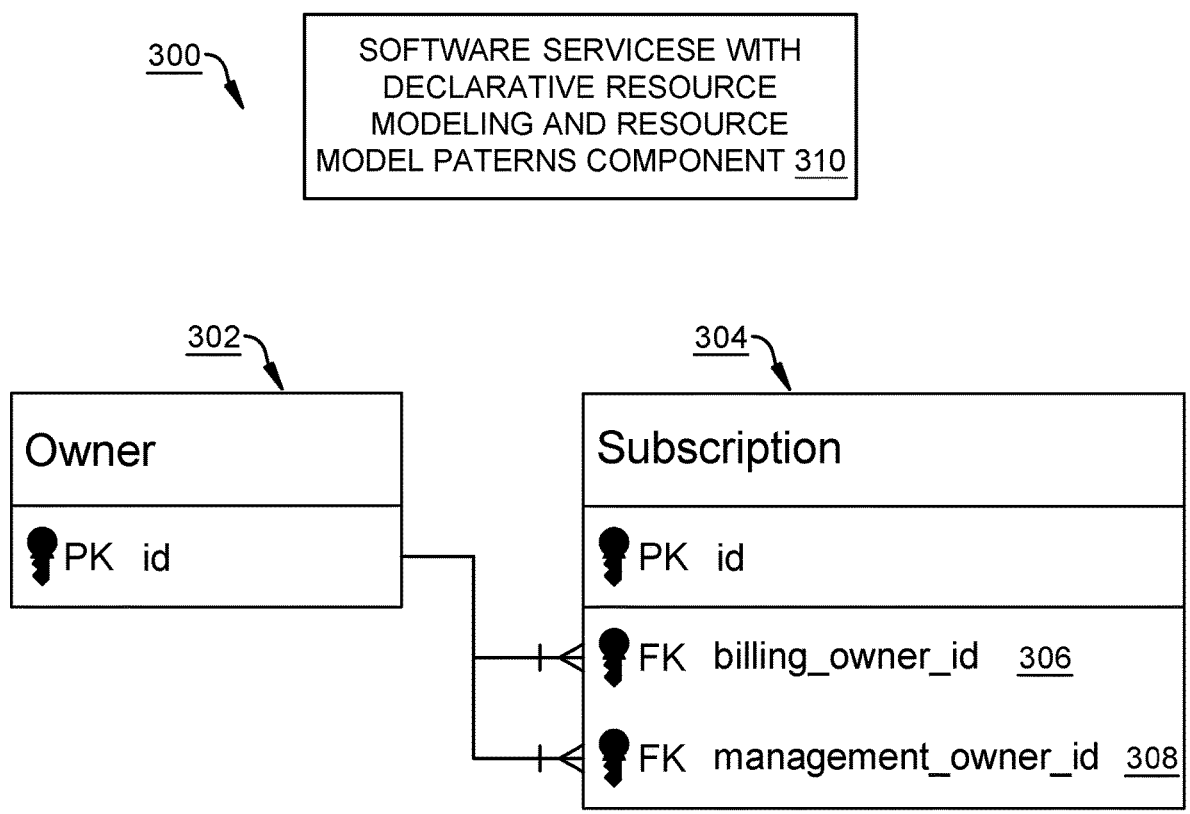
FIG. 3 illustrates an example system architecture of an ownership relationship that can facilitate software services with declarative resource modeling and resource model patterns, in accordance with an embodiment of this disclosure.

FIG. 3 illustrates an example system architecture 300 of an ownership relationship that can facilitate software services with declarative resource modeling and resource model patterns, in accordance with an embodiment of this disclosure. In some examples, part(s) of system architecture 300 can be implemented with part(s) of system architecture 100 of FIG. 1.

System architecture 300 comprises owner 302, subscription 304, and software services with declarative resource modeling and resource model patterns component 310 (which can be similar to software services with declarative resource modeling and resource model patterns component 106 of FIG. 1, and which can use a pattern of system architecture 200 to create a resource model from declarative commands). In turn, subscription 304 comprises billing_owner_id 306 and management_owner_id 308. Billing_owner_id 306 and management_owner_id 308 can identify a billing owner account and a management owner account, respectively, for a subscription identified by subscription 304.

An ownership relationship can be treated as follows. In some examples, when an end user orders a service directly from a service provider, the end user owns the subscription. Then, when an end user orders a service through a distribution channel, it can be that the channel distributor owns the subscription from a billing perspective. Moreover, a channel distributor could offer infrastructure management as a service to end users, and in such case, the channel partner could own the subscription from an infrastructure management viewpoint, as well. Subscription ownership can be used in making access control decisions to a subscription, and to assets of the subscription. In an ownership relationship, there can be one or more owner attributes that contain a foreign key that references an owning organization.

Figure 4:
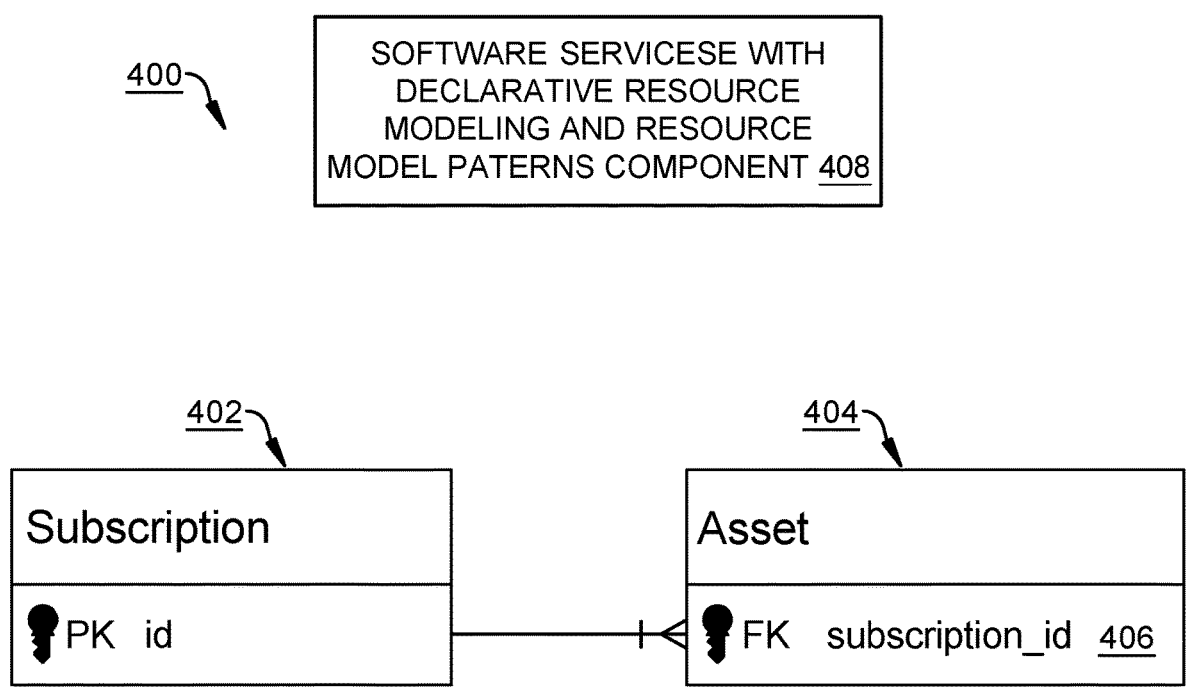
FIG. 4 illustrates an example system architecture of a containment relationship that can facilitate software services with declarative resource modeling and resource model patterns, in accordance with an embodiment of this disclosure.

FIG. 4 illustrates an example system architecture 400 of a containment relationship that can facilitate software services with declarative resource modeling and resource model patterns, in accordance with an embodiment of this disclosure. In some examples, part(s) of system architecture 400 can be implemented with part(s) of system architecture 100 of FIG. 1.

System architecture 400 comprises subscription 402, asset 404, and software services with declarative resource modeling and resource model patterns component 408 (which can be similar to software services with declarative resource modeling and resource model patterns component 106 of FIG. 1, and which can use a pattern of system architecture 200 to create a resource model from declarative commands). In turn, asset 404 comprises subscription_id 406. Subscription 402 can be identified as owning asset 404.

A containment relationship can be treated as follows. A containment relationship can exist between two resources when one resource (e.g., a subscription) owns one or more other resources (e.g., assets).

Figure 5:
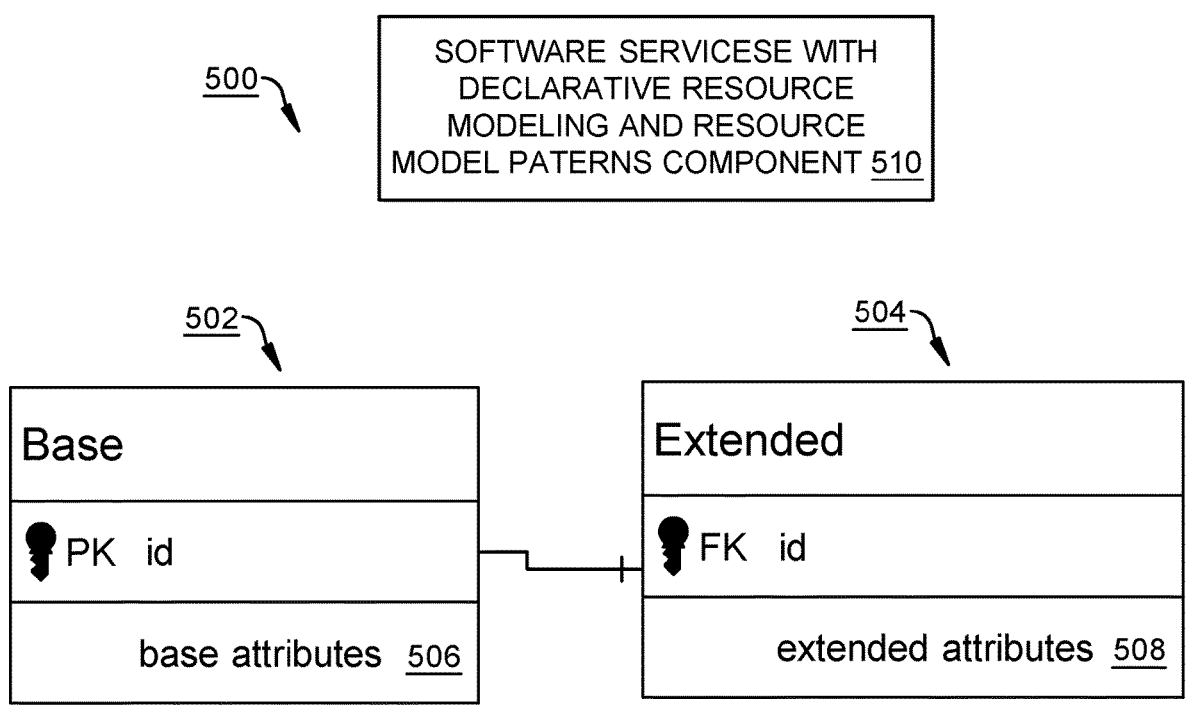
FIG. 5 illustrates an example system architecture of an inheritance relationship that can facilitate software services with declarative resource modeling and resource model patterns, in accordance with an embodiment of this disclosure.

FIG. 5 illustrates an example system architecture 500 of an inheritance relationship that can facilitate software services with declarative resource modeling and resource model patterns, in accordance with an embodiment of this disclosure. In some examples, part(s) of system architecture 500 can be implemented with part(s) of system architecture 100 of FIG. 1.

System architecture 500 comprises base 502, extended 504, and software services with declarative resource modeling and resource model patterns component 510 (which can be similar to software services with declarative resource modeling and resource model patterns component 106 of FIG. 1, and which can use a pattern of system architecture 500 to create a resource model from declarative commands). In turn, base 502 comprises id 506, and extended 504 comprises id 508. Extended 504 can incorporate all attributes defined for base 502, and extend them with additional attributes.

An inheritance relationship can be treated as follows. In cases where there are resources that share some common attributes, but not all attributes, a base resource type can organize resources with better quality performance. An example of a containment relationship can be found in organization and organization unit resources.

Figure 6:
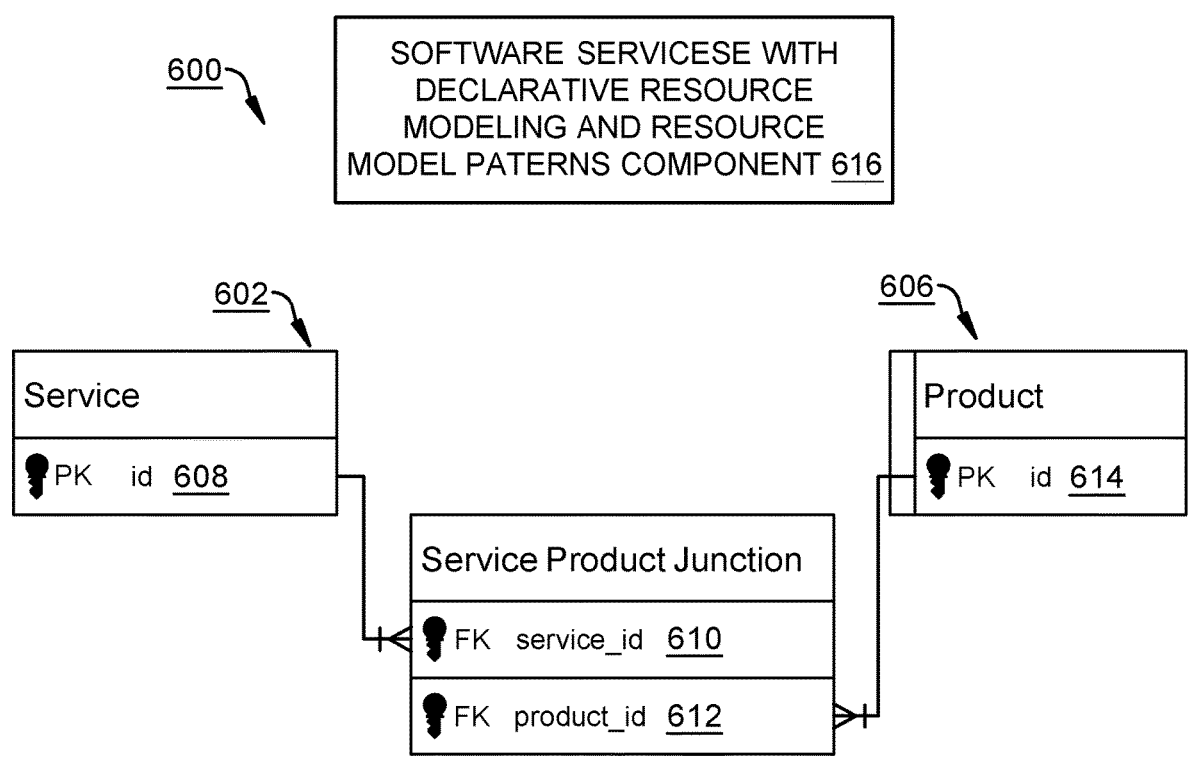
FIG. 6 illustrates an example system architecture of a many-to-many relationship that can facilitate software services with declarative resource modeling and resource model patterns, in accordance with an embodiment of this disclosure.

FIG. 6 illustrates an example system architecture 600 of a many-to-many relationship that can facilitate software services with declarative resource modeling and resource model patterns, in accordance with an embodiment of this disclosure. In some examples, part(s) of system architecture 600 can be implemented with part(s) of system architecture 100 of FIG. 1.

System architecture 600 comprises service 602, service product junction 604, product 606, and software services with declarative resource modeling and resource model patterns component 616 (which can be similar to software services with declarative resource modeling and resource model patterns component 106 of FIG. 1, and which can use a pattern of system architecture 600 to create a resource model from declarative commands). In turn, service 602 comprises id 608: service product junction 604 comprises service_id 610 and product_id 612: and product 606 comprises id 614. Instances of service product junction 604 can be used to associate multiple services with a product, and/or associate multiple products with a service.

A many-to-many relationship can be treated as follows. A many-to-many relationship can comprise many services (e.g., offerings) being classified under a category, while at the same time, a service can be classified into multiple categories. A service can comprise many products, while a product can be part of many services. An organization can have multiple users, while a user can be under many organizations. The same can hold for users and organization units. In some examples, a junction table can be used to model a many-to-many relationship between two resources.

Figure 7:
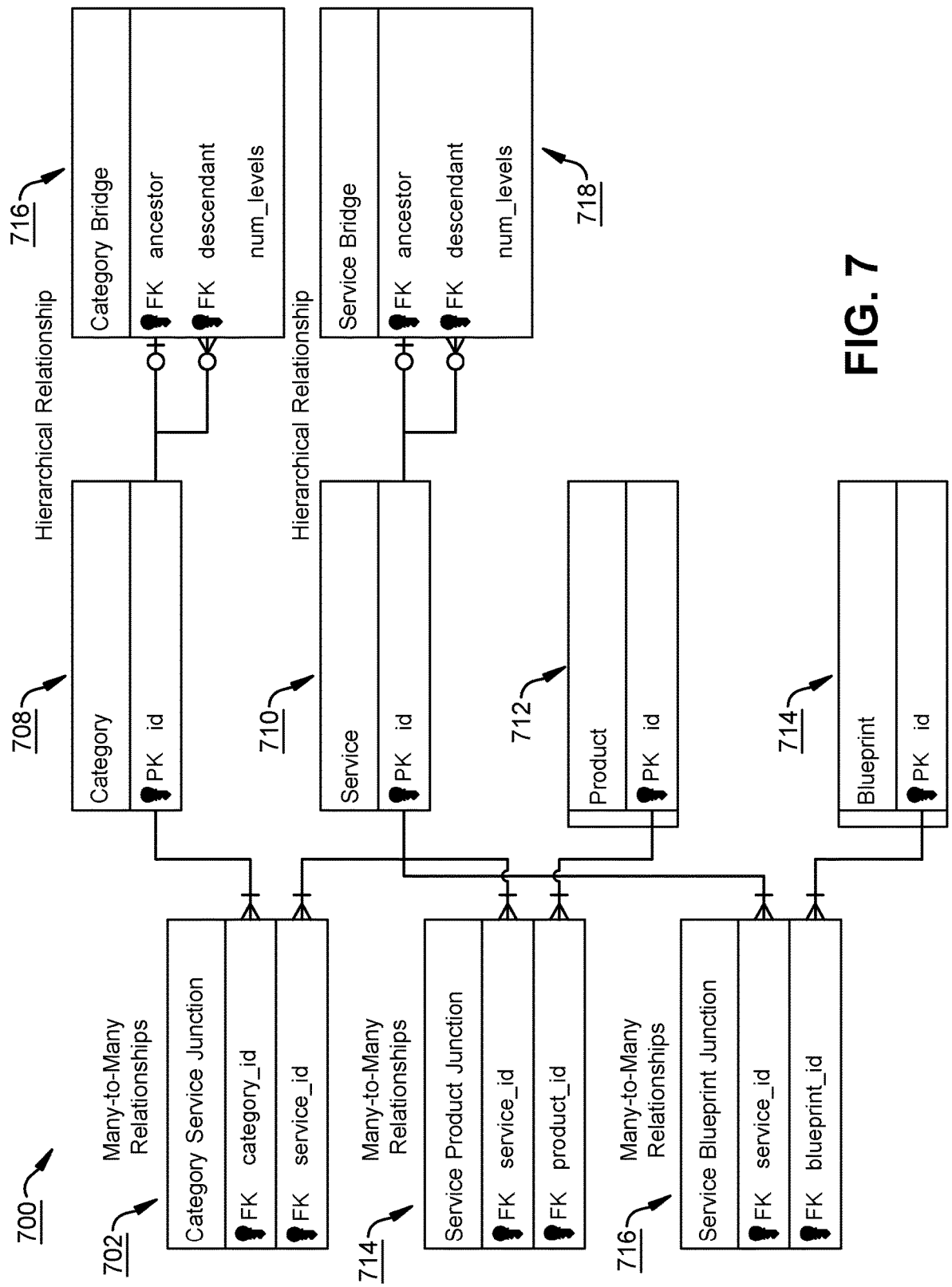
FIG. 7 illustrates an example system architecture of a service catalog resource model that can facilitate software services with declarative resource modeling and resource model patterns, in accordance with an embodiment of this disclosure.

It can be appreciated that there can be other types of junctions than are depicted in FIG. 6, such as category service junction 702 or service blueprint junction 706 of FIG. 7.

FIG. 7 illustrates an example system architecture 700 of a service catalog resource model that can facilitate software services with declarative resource modeling and resource model patterns, in accordance with an embodiment of this disclosure. In some examples, part(s) of system architecture 700 can be implemented with part(s) of system architecture 100 of FIG. 1.

Given the patterns of FIGS. 2-6, resource modeling with patterns can then be handled as follows in FIGS. 7-9, using these five example design patterns.

System architecture 700 comprises category service junction 702, service product junction 704, service blueprint junction 706, category 708, service 710, product 712, blueprint 714, category bridge 716, and service bridge 718.

That is, resources of category 708, service 710, product 712, and blueprint 714 can be associated using the patterns of FIGS. 2-6. Here, there are many-to-many relationships (like in system architecture 600 of FIG. 6) with category service junction 702, service product junction 704, and service blueprint junction 706. And there are hierarchical relationships (like in system architecture 200 of FIG. 2) with category bridge 716 and service bridge 718.

A service catalog resource model can be modeled with patterns as follows. This can utilize a hierarchical relationship pattern, and a many-to-many relationship pattern.

Figure 8:
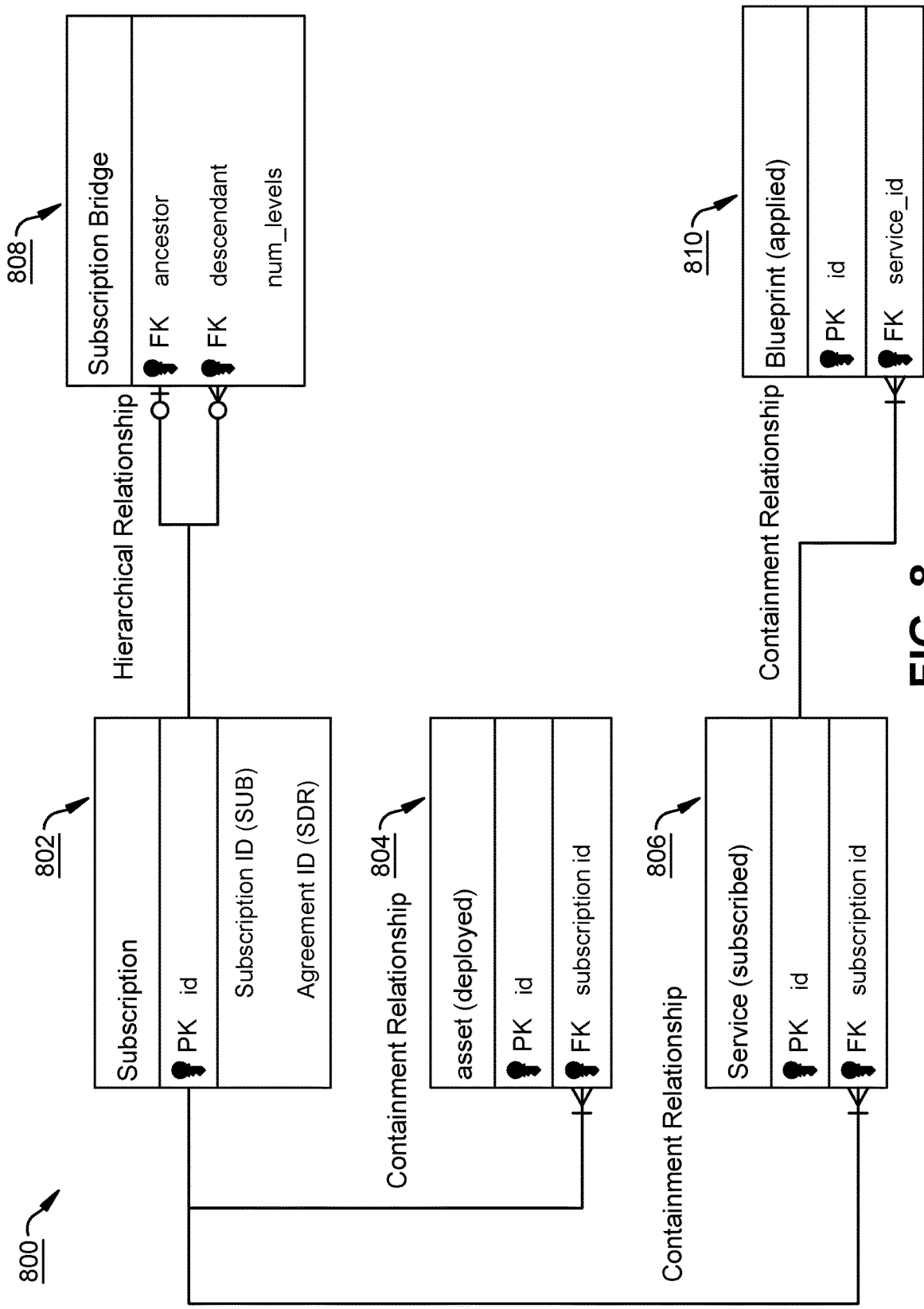
FIG. 8 illustrates an example system architecture of a subscription resource model that can facilitate software services with declarative resource modeling and resource model patterns, in accordance with an embodiment of this disclosure.

FIG. 8 illustrates an example system architecture 800 of a subscription resource model that can facilitate software services with declarative resource modeling and resource model patterns, in accordance with an embodiment of this disclosure. In some examples, part(s) of system architecture 800 can be implemented with part(s) of system architecture 100 of FIG. 1.

System architecture 800 comprises subscription 802, asset (deployed) 804, service (subscribed) 806, subscription bridge 808, and blueprint (applied) 810. There can be a containment relationship (as in system architecture 400 of FIG. 4) between subscription 802 and asset (deployed) 804: a containment relationship between subscription 802 and service (subscribed) 806, a hierarchical relationship (as in system architecture 200 of FIG. 2) between subscription 802 and subscription bridge 808: and a containment relationship between service (subscribed) 806 and blueprint (applied) 810.

A subscription resource model can be modeled with patterns as follows. A subscription resource model can use a hierarchical relationship pattern and a containment relationship pattern. Subscriptions can be considered to be hierarchical in scenarios where an upgrade subscription becomes a child subscription under an original subscription. In usage scenarios with flat subscriptions, it can be that hierarchical relationship patterns are omitted.

Figure 9:
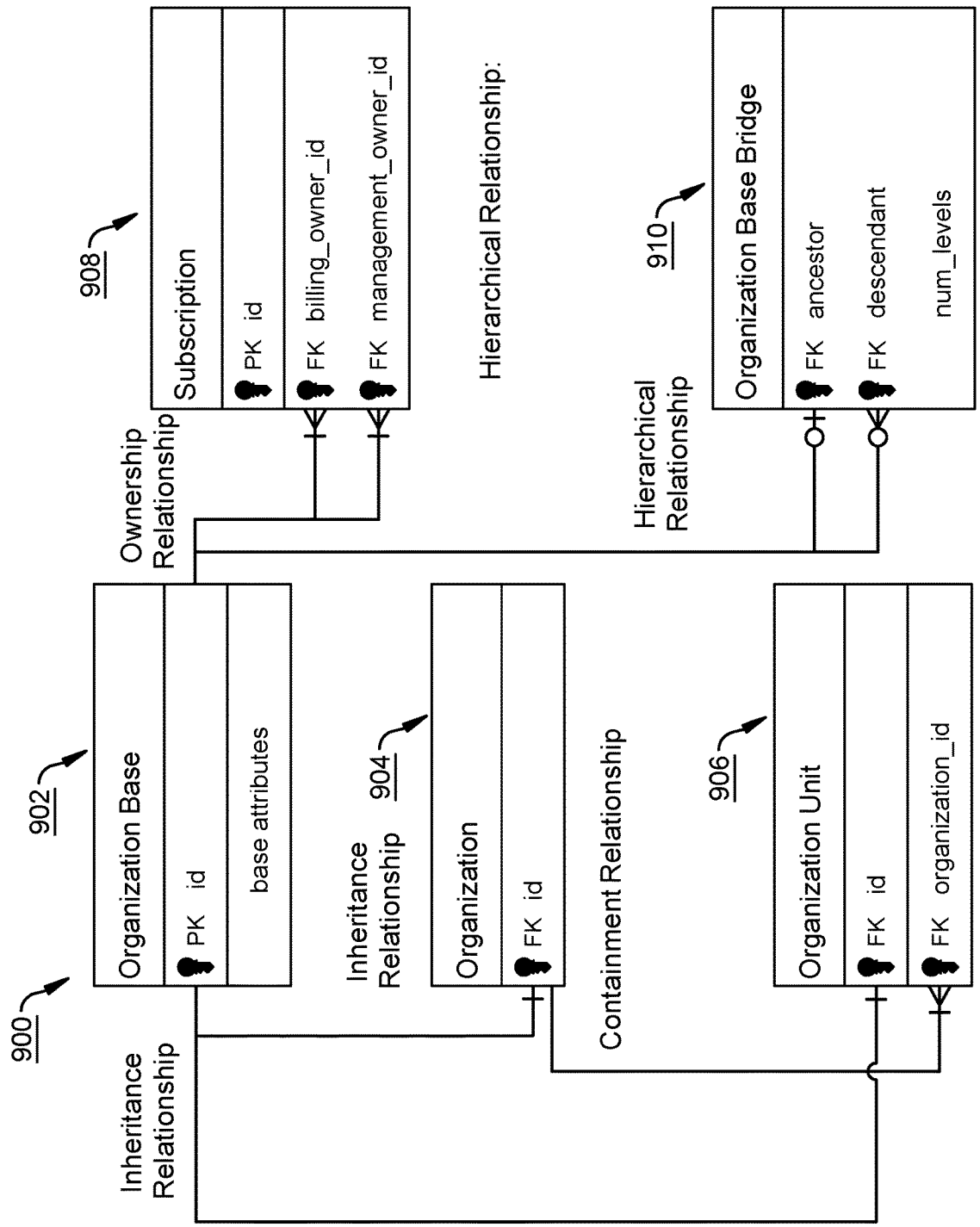
FIG. 9 illustrates an example system architecture of an organizational and subscription resource model that can facilitate software services with declarative resource modeling and resource model patterns, in accordance with an embodiment of this disclosure.

FIG. 9 illustrates an example system architecture 900 of an organizational and subscription resource model that can facilitate software services with declarative resource modeling and resource model patterns, in accordance with an embodiment of this disclosure. In some examples, part(s) of system architecture 900 can be implemented with part(s) of system architecture 100 of FIG. 1.

System architecture 900 comprises organization base 902, organization 904, organization unit 906, subscription 908, and organization base bridge 910. There can be an inheritance relationship (as in system architecture 500 of FIG. 5) between organization base 902 and organization unit 906; there can be an inheritance relationship between organization base 902 and organization 904: there can be a containment relationship (as in system architecture 400 of FIG. 4: an organization can have organization units—e.g., divisions, subsidiaries, branch offices) between organization 904 and organization unit 906: there can be an ownership relationship (as in system architecture 300 of FIG. 3) between organization base 902 and subscription 908: and there can be a hierarchical relationship (as in system architecture 200 of FIG. 2: a channel partner and end customer organization/organization unit hierarchy: a distributor partner organization can have reseller partner organizations that have end customer organizations) between organization base 902 and organization base bridge 910.

An organizational and subscription resource model can be modeled with patterns as follows. An organizational and subscription resource model can utilize a hierarchical relationship pattern, an inheritance relationship pattern, and an ownership relationship pattern.

Once a resource model of a service is built, an entity relationship model (ERM) transformation can be performed.

Example Process Flows

FIG. 10 illustrates an example process flow 1000 that can facilitate software services with declarative resource modeling and resource model patterns, in accordance with an embodiment of this disclosure. In some examples, one or more embodiments of process flow 1000 can be implemented by system architecture 100 of FIG. 1, or computing environment 1300 of FIG. 13.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 1100 of FIG. 11, and/or process flow 1200 of FIG. 12

Process flow 1000 begins with 1002, and moves to operation 1004.

Operation 1004 depicts receiving a first command that declares a first relationship between a first pair of computer resources of a group of computer resources, wherein a number of relationships in the group of relationships has a defined size. That is, a declarative resource modeling language can be used to declare a relationship between two resources, and this relationship can be one of a set number of patterns.

In some examples, the group of relationships comprises a hierarchical relationship, an ownership relationship, a containment relationship, an inheritance relationship, and a many-to-many relationship.

Using the example of FIG. 1, the first command can be drawn from declarative resource model language commands 102, and the group of relationships can comprise resource model patterns 104. The first command can be received by software services with declarative resource modeling and resource model patterns component 106.

In some examples, the first command declares a first attribute of a computer resource of the first pair of computer resources. In some examples, the first command declares a second attribute of the computer resource. That is, the first command can be of the form, "CREATE HIERARCHY 'Organization' WITH name Text, country Text."

In some examples, other types of relationships can be used than those listed here as part of facilitating software services with declarative resource modeling and resource model patterns After operation 1004, process flow 1000 moves to operation 1006.

Operation 1006 depicts receiving a second command that declares a second relationship between a second pair of computer resources of the group of computer resources, wherein the second relationship is any second one from the group of relationships. That is, the declarative resource modeling language of operation 1004 can be used to declare another relationship between two resources.

Using the example of FIG. 1, the second command can be drawn from declarative resource model language commands 102, and can be received by software services with declarative resource modeling and resource model patterns component 106.

After operation 1006, process flow 1000 moves to operation 1008.

Operation 1008 depicts creating a resource model for the group of computer resources based on the first command and the second command. That is, a resource model can be built based on the declarations of operations 1004-1006.

Using the example of FIG. 1, software services with declarative resource modeling and resource model patterns component 106 can process the first command and the second command to create resource model 108, and from resource model 108, create created service 110.

In some examples, operation 1008 comprises receiving a third command that declares a type of a computer resource of the group of computer resources, where creating the resource model is performed based on the third command. That is, the third command can be of the form, "CREATE HIERARCHY 'Organization.'"

In some examples, the third command declares a first attribute of the computer resource. In some examples, the third command declares a second attribute of the computer resource different than the first attribute. That is, one or multiple attributes for a resource hierarchy can be declared of the form "CREATE HIERARCHY."

In some examples, operation 1008 comprises receiving a third command that declares that a computer resource of the group of computer resources is a base resource from which inheritance is enabled, where creating the resource model is performed based on the third command. That is, the third command can be a declaration of the form, "CREATE GENERALIZATION OrganizationBase WITH baseAttribute."

In some examples, operation 1008 can comprise creating a resource model for the group of computer resources based on the first command, the second command, and, in general, a sequence of more commands.

After operation 1008, process flow 1000 moves to operation 1010.

Operation 1010 depicts storing the resource model in a memory. That is, the resource model created in operation 1008 can be saved in a computer memory for later use.

After operation 1010, process flow 1000 moves to 1012, where process flow 1000 ends.

FIG. 11 illustrates an example process flow 1100 that can facilitate software services with declarative resource modeling and resource model patterns, in accordance with an embodiment of this disclosure. In some examples, one or more embodiments of process flow 1100 can be implemented by system architecture 100 of FIG. 1, or computing environment 1300 of FIG. 13.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 1000 of FIG. 10, and/or process flow 1200 of FIG. 12

Process flow 1100 begins with 1102, and moves to operation 1104.

Operation 1104 depicts receiving a first command that declares a first relationship between a first pair of computer resources of a group of computer resources, wherein the first relationship is any first member of members of a group of relationships, wherein the group of relationships has a defined size. In some examples, operation 1104 can be implemented in a similar manner as operation 1004 of FIG. 10.

After operation 1104, process flow 1100 moves to operation 1106.

Operation 1106 depicts receiving a second command that declares a second relationship between a second pair of computer resources of the group of computer resources. In some examples, operation 1106 can be implemented in a similar manner as operation 1006 of FIG. 10.

After operation 1106, process flow 1100 moves to operation 1108.

Operation 1108 depicts creating a resource model for the group of computer resources based on the first command and the second command. In some examples, operation 1108 can be implemented in a similar manner as operation 1008 of FIG. 10.

In some examples, operation 1108 comprises generating a relational database entity that corresponds to the resource model, storing the relational database entity. That is, a declarative resource model language processor can generate entities as part of creating a resource model.

In some examples, operation 1108 comprises translating the resource model into a relational database schema, and storing the relational database schema. That is, a declarative resource model language processor can generate a relational database schema as part of creating a resource model.

In some examples, operation 1108 comprises creating a query statement for a database, wherein the query statement corresponds to the resource model, and storing the query statement. That is, a declarative resource model language processor can generate a database query statement as part of creating a resource model.

In some examples, operation 1108 comprises creating a reference query statement based on a join operation on a first database and a second database, wherein the reference query statement corresponds to the resource model, and storing the reference query statement. That is, a declarative resource model language processor can generate a reference query statement as part of creating a resource model.

In some examples, operation 1108 comprises defining a query representational state transfer application programming interface based on the resource model, and storing the query representational state transfer application programming interface. That is, a declarative resource model language processor can generate a REST API as part of creating a resource model.

In some examples, operation 1108 comprises defining a reference query representational state transfer application programming interface based on the resource model, and storing the reference query representational state transfer application programming interface. That is, a declarative resource model language processor can generate a reference query REST API as part of creating a resource model.

After operation 1108, process flow 1100 moves to 1110, where process flow 1100 ends.

FIG. 12 illustrates an example process flow 1200 that can facilitate software services with declarative resource modeling and resource model patterns, in accordance with an embodiment of this disclosure. In some examples, one or more embodiments of process flow 1200 can be implemented by system architecture 120 of FIG. 1, or computing environment 1300 of FIG. 13.

It can be appreciated that the operating procedures of process flow 1200 are example operating procedures, and that there can be embodiments that implement more or fewer operating procedures than are depicted, or that implement the depicted operating procedures in a different order than as depicted. In some examples, process flow 1200 can be implemented in conjunction with one or more embodiments of one or more of process flow 1000 of FIG. 10, and/or process flow 1100 of FIG. 11

Process flow 1200 begins with 1202, and moves to operation 1204.

Operation 1204 depicts receiving a first command that declares a first relationship between a first subgroup of two computer resources of a group of computer resources, wherein the first relationship is a first member of members of a group of relationships, wherein respective relationships of the group of relationships are defined prior to receiving the first command, and wherein a number of relationships of the group of relationships is defined prior to receiving the first command. In some examples, operation 1204 can be implemented in a similar manner as operation 1004 of FIG. 10.

In some examples, the members of the group of relationships may comprise a first member representing a hierarchical relationship, a second member representing an ownership relationship, a third member representing a containment relationship, a fourth member representing an inheritance relationship, a fifth member representing a many-to-many relationship, as well as other relationships.

In some examples, the first command identifies a logical relationship between the first subgroup of two computer resources, and omits specifying a control flow between the first subgroup of two computer resources. That is, the first command can be a command in a declarative resource model language is.

In some examples, the first command declares at least one attribute of a computer resource of the first subgroup of two computer resources.

After operation 1204, process flow 1200 moves to operation 1206.

Operation 1206 depicts receiving a second command that declares a second relationship between a second subgroup of two computer resources of the group of computer resources, wherein the second relationship is a second member of the members of the group of relationships. In some examples, operation 1204 can be implemented in a similar manner as operation 1004 of FIG. 10.

After operation 1206, process flow 1200 moves to operation 1208.

Operation 1208 depicts creating a resource model for the group of computer resources based on the first command and the second command. In some examples, operation 1208 can be implemented in a similar manner as operation 1004 of FIG. 10.

In some examples, the resource model comprises a data schema configured to store the group of computer resources.

In some examples, operation 1208 comprises receiving a third command that declares a type of a computer resource of the group of computer resources, where creating the resource model is performed based on the third command.

After operation 1208, process flow 1200 moves to 1210, where process flow 1200 ends.

Example Operating Environment

Figure 13:
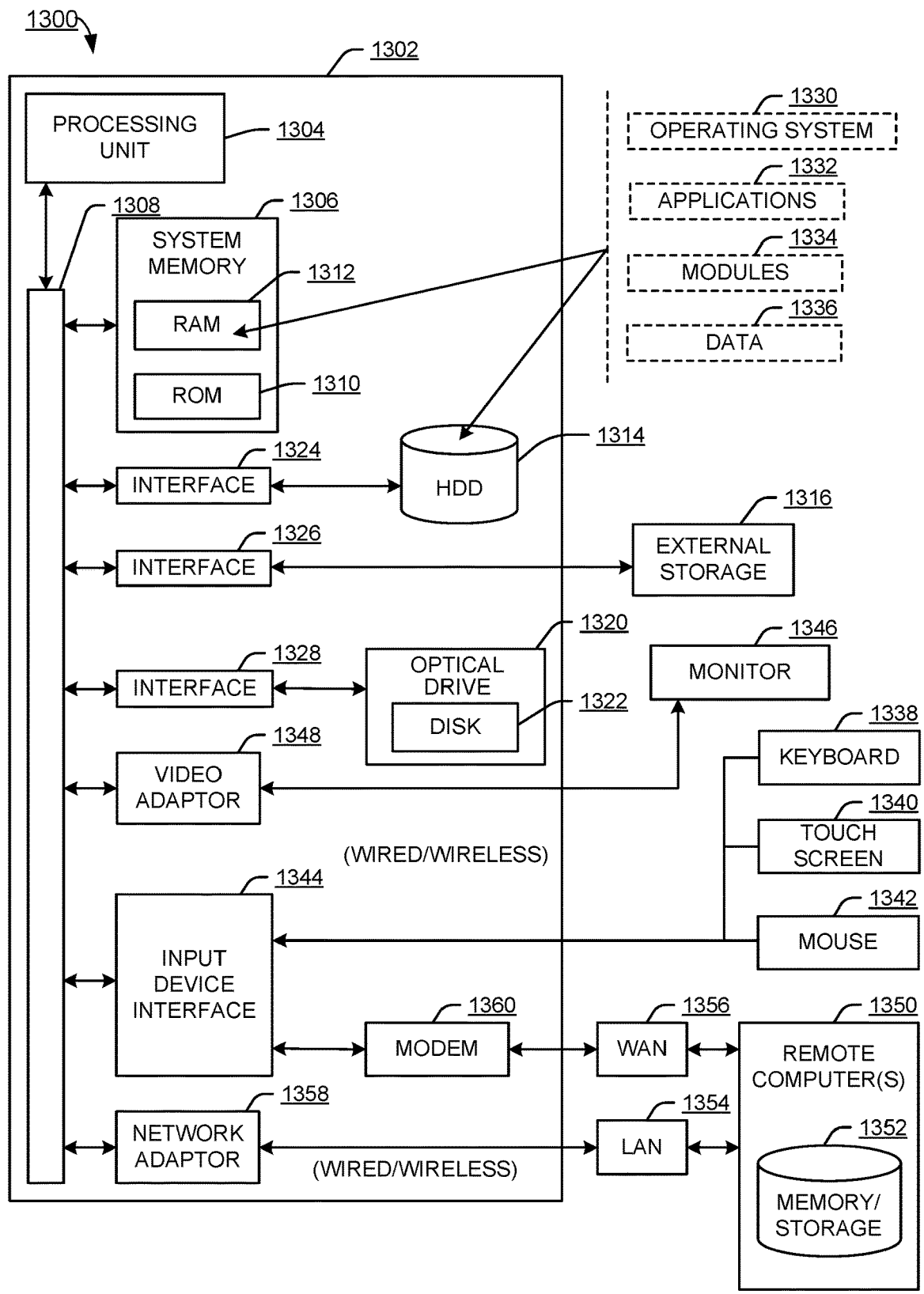
FIG. 13 illustrates an example block diagram of a computer operable to execute an embodiment of this disclosure.

In order to provide additional context for various embodiments described herein, FIG. 13 and the following discussion are intended to provide a brief, general description of a suitable computing environment 1300 in which the various embodiments of the embodiment described herein can be implemented.

For example, parts of computing environment 1300 can be used to implement one or more embodiments of system architecture 100 of FIG. 1, system architecture 200 of FIG. 2, system architecture 300 of FIG. 3, system architecture 400 of FIG. 4, system architecture 500 of FIG. 5, system architecture 600 of FIG. 6, system architecture 700 of FIG. 7, system architecture 800 of FIG. 8, and/or system architecture 900 of FIG. 9.

In some examples, computing environment 1300) can implement one or more embodiments of the process flows of FIGS. 10-12 to facilitate software services with declarative resource modeling and resource model patterns.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IOT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a nonvolatile storage such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), one or more external storage devices 1316 (e.g., a magnetic floppy disk drive (FDD) 1316, a memory stick or flash drive reader, a memory card reader, etc.) and an optical disk drive 1320 (e.g., which can read or write from a CD-ROM disc, a DVD, a BD, etc.). While the internal HDD 1314 is illustrated as located within the computer 1302, the internal HDD 1314 can also be configured for external use in a suitable chassis (not shown). Additionally, while not shown in environment 1300, a solid state drive (SSD) could be used in addition to, or in place of, an HDD 1314. The HDD 1314, external storage device(s) 1316 and optical disk drive 1320 can be connected to the system bus 1308 by an HDD interface 1324, an external storage interface 1326 and an optical drive interface 1328, respectively. The interface 1324 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

Computer 1302 can optionally comprise emulation technologies. For example, a hypervisor (not shown) or other intermediary can emulate a hardware environment for operating system 1330, and the emulated hardware can optionally be different from the hardware illustrated in FIG. 13. In such an embodiment, operating system 1330 can comprise one virtual machine (VM) of multiple VMs hosted at computer 1302. Furthermore, operating system 1330 can provide runtime environments, such as the Java runtime environment or the .NET framework, for applications 1332. Runtime environments are consistent execution environments that allow applications 1332 to run on any operating system that includes the runtime environment. Similarly, operating system 1330 can support containers, and applications 1332 can be in the form of containers, which are lightweight, standalone, executable packages of software that include, e.g., code, runtime, system tools, system libraries and settings for an application.

Further, computer 1302 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1302, e.g., applied at the application execution level or at the operating system (OS) kernel level, thereby enabling security at any level of code execution.

A user can enter commands and information into the computer 1302 through one or more wired/wireless input devices, e.g., a keyboard 1338, a touch screen 1340, and a pointing device, such as a mouse 1342. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1304 through an input device interface 1344 that can be coupled to the system bus 1308, but can be connected by other interfaces, such as a parallel port, an IEEE 1394 serial port, a game port, a USB port, an IR interface, a BLUETOOTH® interface, etc.

A monitor 1346 or other type of display device can be also connected to the system bus 1308 via an interface, such as a video adapter 1348. In addition to the monitor 1346, a computer typically includes other peripheral output devices (not shown), such as speakers, printers, etc.

The computer 1302 can operate in a networked environment using logical connections via wired and/or wireless communications to one or more remote computers, such as a remote computer(s) 1350. The remote computer(s) 1350 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1352 is illustrated. The logical connections depicted include wired/wireless connectivity to a local area network (LAN) 1354 and/or larger networks, e.g., a wide area network (WAN) 1356. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1354 through a wired and/or wireless communication network interface or adapter 1358. The adapter 1358 can facilitate wired or wireless communication to the LAN 1354, which can also include a wireless access point (AP) disposed thereon for communicating with the adapter 1358 in a wireless mode.

When used in a WAN networking environment, the computer 1302 can include a modem 1360 or can be connected to a communications server on the WAN 1356 via other means for establishing communications over the WAN 1356, such as by way of the Internet. The modem 1360, which can be internal or external and a wired or wireless device, can be connected to the system bus 1308 via the input device interface 1344. In a networked environment, program modules depicted relative to the computer 1302 or portions thereof, can be stored in the remote memory/storage device 1352. It will be appreciated that the network connections shown are examples, and other means of establishing a communications link between the computers can be used.

When used in either a LAN or WAN networking environment, the computer 1302 can access cloud storage systems or other network-based storage systems in addition to, or in place of, external storage devices 1316 as described above. Generally, a connection between the computer 1302 and a cloud storage system can be established over a LAN 1354 or WAN 1356 e.g., by the adapter 1358 or modem 1360, respectively. Upon connecting the computer 1302 to an associated cloud storage system, the external storage interface 1326 can, with the aid of the adapter 1358 and/or modem 1360, manage storage provided by the cloud storage system as it would other types of external storage. For instance, the external storage interface 1326 can be configured to provide access to cloud storage sources as if those sources were physically connected to the computer 1302.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors: single-processors with software multithread execution capability: multi-core processors: multi-core processors with software multithread execution capability: multi-core processors with hardware multithread technology: parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A: X employs B: or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   at least one processor; and
   at least one memory coupled to the at least one processor, comprising instructions that cause the at least one processor to perform operations comprising:
   receiving a first command that declares a first relationship between a first pair of computer resources of a group of computer resources, wherein the first relationship is any first one from a group of relationships, wherein a number of relationships in the group of relationships has a defined size, and wherein the group of relationships comprises a hierarchical relationship, an ownership relationship, a containment relationship, and an inheritance relationship;
   receiving a second command that declares a second relationship between a second pair of computer resources of the group of computer resources, wherein the second relationship is any second one from the group of relationships;
   creating a resource model for the group of computer resources based on the first command and the second command, wherein creating the resource model comprises at least one of generating an entity, performing an entity resource model transformation, creating a query statement, creating a reference query statement with a join operation, defining a query representational state transfer application programming interface, and defining a reference query representational state transfer application programming interface; and
   storing the resource model in a memory.

2. The system of claim 1, wherein the group of relationships comprises a many-to-many relationship.

3. The system of claim 1, wherein the first command declares a first attribute of a computer resource of the first pair of computer resources.

4. The system of claim 3, wherein the first command declares a second attribute of the computer resource.

5. The system of claim 1, wherein the operations further comprise:
   receiving a third command that declares a type of a computer resource of the group of computer resources, and wherein creating the resource model is performed based on the third command.

6. The system of claim 5, wherein the third command declares a first attribute of the computer resource.

7. The system of claim 6, wherein the third command declares a second attribute of the computer resource different than the first attribute.

8. The system of claim 1, wherein the operations further comprise:
   receiving a third command that declares that a computer resource of the group of computer resources is a base resource from which inheritance is enabled, and wherein creating the resource model is performed based on the third command.

9. A method, comprising:
   receiving, by a system comprising a processor, a first command that declares a first relationship between a first pair of computer resources of a group of computer resources, wherein the first relationship is any first member of members of a group of relationships, wherein the group of relationships has a defined size, and wherein the group of relationships comprises a hierarchical relationship, an ownership relationship, a containment relationship, and an inheritance relationship;

receiving, by the system, a second command that declares a second relationship between a second pair of computer resources of the group of computer resources; and creating, by the system, a resource model for the group of computer resources based on the first command and the second command, wherein creating comprises at least one of generating an entity, performing an entity resource model transformation, creating a query statement, creating a reference query statement with a join operation, defining a query representational state transfer application programming interface, and defining a reference query representational state transfer application programming interface.

10. The method of claim 9, further comprising:
generating, by the system, a relational database entity that corresponds to the resource model; and
storing, by the system, the relational database entity.

11. The method of claim 9, further comprising:
translating, by the system, the resource model into a relational database schema; and
storing, by the system, the relational database schema.

12. The method of claim 9, further comprising:
creating, by the system, a query statement for a database, wherein the query statement corresponds to the resource model; and
storing, by the system, the query statement.

13. The method of claim 9, further comprising:
creating, by the system, a reference query statement based on a join operation on a first database and a second database, wherein the reference query statement corresponds to the resource model; and
storing, by the system, the reference query statement.

14. The method of claim 9, further comprising:
defining, by the system, a query representational state transfer application programming interface based on the resource model; and
storing, by the system, the query representational state transfer application programming interface.

15. The method of claim 9, further comprising:
defining, by the system, a reference query representational state transfer application programming interface based on the resource model; and
storing, by the system, the reference query representational state transfer application programming interface.

16. The non-transitory computer-readable medium of claim 15, wherein the members of the group of relationships comprise a first member representing a hierarchical relationship, a second member representing an ownership relationship, a third member representing a containment relationship, a fourth member representing an inheritance relationship, and a fifth member representing a many-to-many relationship.

17. A non-transitory computer-readable medium comprising instructions that, in response to execution, cause a system comprising a processor to perform operations, comprising:

receiving a first command that declares a first relationship between a first subgroup of two computer resources of a group of computer resources, wherein the first relationship is a first member of members of a group of relationships, wherein the group of relationships has a defined size, and wherein the group of relationships comprises a hierarchical relationship, an ownership relationship, a containment relationship, and an inheritance relationship;

receiving a second command that declares a second relationship between a second subgroup of two computer resources of the group of computer resources, wherein the second relationship is a second member of the members of the group of relationships; and creating a resource model for the group of computer resources based on the first command and the second command, wherein creating comprises at least one of generating an entity, performing an entity resource model transformation, creating a query statement, creating a reference query statement with a join operation, defining a query representational state transfer application programming interface, and defining a reference query representational state transfer application programming interface.

18. The non-transitory computer-readable medium of claim 17, wherein the first command identifies a logical relationship between the first subgroup of two computer resources, and omits specifying a control flow between the first subgroup of two computer resources.

19. The non-transitory computer-readable medium of claim 17, wherein the resource model comprises a data schema configured to store the group of computer resources.

20. The non-transitory computer-readable medium of claim 17, wherein the first command declares at least one attribute of a computer resource of the first subgroup of two computer resources.

* * * * *